US008308089B2

(12) United States Patent
Park et al.

(10) Patent No.: US 8,308,089 B2
(45) Date of Patent: Nov. 13, 2012

(54) METHOD FOR PREPARING IMPREGNATING PITCH FOR CARBON-CARBON COMPOSITE

(75) Inventors: In Seo Park, Daejeon-si (KR); Jin Yong Lee, Daejeon-si (KR); Kwang Youn Cho, Seoul (KR)

(73) Assignee: Agency for Defense Development, Daejeon-Si (KR)

(*) Notice: Subject to any disclaimer, the term of this patent is extended or adjusted under 35 U.S.C. 154(b) by 302 days.

(21) Appl. No.: 12/874,314

(22) Filed: Sep. 2, 2010

(65) Prior Publication Data

US 2011/0204164 A1    Aug. 25, 2011

(30) Foreign Application Priority Data

Feb. 19, 2010  (KR) .................. 10-2010-0015064

(51) Int. Cl.
*B02C 19/00* (2006.01)
(52) U.S. Cl. .................. 241/21; 241/23; 241/29
(58) Field of Classification Search ............ 241/23, 241/29, 21
See application file for complete search history.

(56) References Cited

U.S. PATENT DOCUMENTS

| | | | |
|---|---|---|---|
| 5,413,738 A | 5/1995 | Lewis et al. | |
| 6,221,475 B1 | 4/2001 | Domergue et al. | |

FOREIGN PATENT DOCUMENTS

| | | | |
|---|---|---|---|
| JP | 60-166391 A | 8/1985 |
| JP | 60-258296 A | 12/1985 |
| JP | 63-145392 A | 6/1988 |
| JP | 6-158054 A | 6/1994 |
| JP | 6-248274 A | 9/1994 |
| JP | 11-130553 A | 5/1999 |
| JP | 2000-86382 A | 3/2000 |
| KR | 1995-0011212 B1 | 9/1995 |
| KR | 2000-0049126 A | 7/2000 |
| KR | 10-0653929 B1 | 11/2006 |

*Primary Examiner* — Mark Rosenbaum
(74) *Attorney, Agent, or Firm* — Pearne & Gordon LLP

(57) ABSTRACT

The present invention discloses a method for preparing an impregnating pitch which is used for the manufacture of carbon-carbon composites having excellent mechanical properties at an ultra high temperature, abrasion resistance and the like, wherein the impregnating pitch having a low viscosity and an improved carbonization yield is provided by facilitating cross-linking reactions between the aromatic compounds in the pitch, while eliminating heat treatment.

8 Claims, 2 Drawing Sheets

METHOD FOR PREPARING IMPREGNATING PITCH FOR CARBON-CARBON COMPOSITE

FIELD OF THE INVENTION

The present invention relates to a method for preparing a pitch for impregnating (hereinafter, referred as 'impregnating pitch') used for the manufacture of carbon-carbon composite (hereinafter, referred as 'CC composite') from coal tar pitch as a raw material, specifically to a method for preparing an impregnating pitch for CC composite which has a low viscosity and an improved carbonization yield by modifying aromatic compounds in the raw material coal tar pitch without heat treatment.

BACKGROUND OF THE INVENTION

CC composite is advanced materials having an excellent specific strength, specific stiffness and abrasion resistance at an ultra high temperature.

CC composite is generally prepared by impregnating pitch into carbon fibers. Since CC composite is used under severe conditions involving high temperature, pressure and speed, the graphite crystal structure of the matrix formed by an impregnated pitch should be brought to have a fine mosaic or isotropic structure, not a lamellar structure, and densification thereof is also needed. Further, the interfacial adhesion between the matrix formed by heat treatment of the impregnated pitch and carbon fiber needs to be improved. When the graphite crystalline structure is a lamellar structure, the CC composite can be seriously damaged, as the 'a' and 'b' planes of the graphite crystal are likely to be peeled off by fluids having high temperature, flow rate and pressure. When the interfacial adhesion between the carbon fiber and the matrix is weak, fluids having high temperature, flow rate and pressure is likely to be concentrated on such weak interfacial part, then facilitates oxidation thereof, and accelerates peeling off occurred in 'a' and 'b' planes due to stress concentration, resulting in significant abrasion of the CC composite.

In manufacturing CC composite, an impregnating pitch is used in a molten form at a temperature of 300-400° C. where it shows the optimum viscosity for high densification of a CC composite preform. An impregnating pitch having the lower viscosity shows the lower carbonization yield, because it contains relatively more volatile components having a low molecular weight and a low boiling point. Although the impregnating pitch having a low viscosity effectively penetrates into a CC composite preform during the impregnation process, thereby having improved impregnation efficiency, carbonization yield thereof by a carbonization process at 1,000° C. or more in an inert atmosphere followed by a graphitization process at 2,000° C. or more in an inert atmosphere becomes low, and the desired density in the final CC composite can be hardly achieved. Therefore, in order to improve the density of the CC composite, a cycle of an impregnation, carbonization and graphitization process should be repeated more than 5 times.

An impregnating pitch for CC composite has been prepared by heating a pitch in an inert atmosphere for improving the degree of graphite crystallinity and an impregnating efficiency, thereby a spherical anisotropic mesophase which is easily transferred to graphite crystals can be formed, and then by removing volatile compounds having a low molecular weight and a low boiling point so as to increase the carbonization yield.

Methods of manufacturing an impregnating pitch for CC composite have been disclosed in this field of art. For example, Korean patent No. 0653929, Japanese patent laid-open Nos. 1998-145392 and 1994-248274 describe methods for preparing an impregnating pitch which comprises up to 50% of lamellar-structured mesophase that is easily transferred to graphite crystals, by carrying out a carbonization process at 1,000° C. or more and a graphitization process at 2,000° C. or more for improving carbonization yield, and then heat treatment for developing graphite crystals. Although the mesophase-containing pitch obtained from the conventional methods has graphite crystals well-developed through the final graphitization process at 2,000° C. or more, the matrix portion of the CC composite becomes to have a lamellar structure owing to the well-developed graphite crystals, resulting in rapid abrasion of the CC composite by fluids having high temperature, speed and pressure. Further, by polycondensation of aromatic compounds present in pitch occurred during the heat treatment of the pitch, the heat-treated impregnating pitch becomes a higher molecular weight polymer with an increased viscosity of at least 100 cP, so that the penetration of the impregnating pitch into the CC composite becomes difficult and the impregnation efficiency becomes lowered, resulting in hindering the densification of the CC composite.

Further examples of methods of manufacturing CC composite, other than those using an impregnating pitch, include: a method using a thermoplastic resin, a thermosetting resin and an isotropic pitch (Japanese patent laid-open No. 1999-130553A2); a method using a thermosetting resin and a mixture of a common pitch powder added with a graphite powder (Korean patent publication No. 1995-0011212); and a method wherein a pyrolized carbon is deposited onto a carbon fiber preform (Korean patent laid-open No. 2000-0049126, Japanese patent laid-open No. 2000-086382A2). However, these methods also have drawbacks such as difficulties in the densification of CC composite, and particularly a method using deposition of pyrolized carbons onto a carbon fiber requires a long manufacturing period and high production cost, thereby being economically disadvantageous.

Properties of an impregnating pitch demanded for CC composite manufacture include a low viscosity and a high carbonization yield, in view of the impregnation efficiency and densification efficiency of the final CC composite product. Since the low viscosity and the high carbonization yield of pitch are conflicting properties each other, there still remains a need for overcoming such conflicting properties so as to develop a high performance CC composite at a low cost.

SUMMARY OF THE INVENTION

With a purpose to overcome the problems of the conventional CC composite manufacturing methods, the present invention is to provide a method of preparing an impregnating pitch for CC composite using coal tar pitch as a raw material, wherein the aromatic compounds in the raw material i.e. coal tar pitch are modified so as to facilitate the crosslinking reaction between said aromatic compounds without heat treatment, thereby increasing the carbonization yield while maintaining a low viscosity.

DETAILED DESCRIPTION OF THE INVENTION

The method of preparing an impregnating pitch for CC composite according to the present invention is characterized by comprising the following steps of: (i) crushing coal tar pitch; (ii) grinding the crushed coal tar pitch together with an alcohol solvent and a crosslinking agent for dissolution; (iii)

drying the mixture from the step (ii) for removing the alcohol solvent; and (iv) cooling and grinding the mixture obtained from the step (iii).

As for the raw material pitch which can be used in the step (i) of the method of preparing an impregnating pitch for CC composites of the present invention, any coal tar pitch having a softening point of 50-130° C. and a melt viscosity of 30 cP or less may be used, and particularly those having a softening point of 50-130° C., a melt viscosity of 26 cP or less and the carbonization yield of 15~45%, preferably 36.9% determined by a thermogravimetric analysis (argon, 5° C./min., 1,000° C., hereinafter, referred as TGA) may be preferably used.

The method of crushing the coal tar pitch used in the step (i) according to the present method is not specifically limited and can be carried out by using conventional crushing means. In the crushing step, the coal tar pitch is preferably crushed to the average particle size of 1,000 μm or less. When the average particle size thereof is as large as more than 1,000 μm, such large particles cannot be effectively ground by ball milling with an alcohol solvent in the subsequent grinding step, thereby resulting in a low dissolution efficiency in the alcohol solvent, and further hindering crosslinking between the molecules in pitch through radical transition, disadvantageously.

As for the alcohol solvents which can be used in the step (ii) of the method of preparing an impregnating pitch for CC composite of the present invention, various alcohols such as ethanol, methanol, tetrahydrofuran (THF), toluene and the like may be employed. Since pitch is a type of polymers, pitch having a low molecular weight can be dissolved in alcohols. During the course of dissolution, alcohols react with or affect the end radicals of the pitch molecules, wherein the end radicals are mostly aromatics. Although any alcohols in which pitch can be dissolved may be used without limitation, those having excellent reactivity with the aromatic radicals in pitch and thus facilitating the dissolution of pitch are preferably selected. For the examples of the preferred alcohols, methanol, ethanol, toluene, xylene and the like may be mentioned.

In the step (ii) of grinding the crushed coal tar pitch obtained from the step (i) together with an alcohol solvent for dissolution, the grinding method is not specifically limited, and can be carried out by using a conventional grinding means such as a ball mill. For an effective grinding and dissolution, it is preferred that the coal tar pitch from the step (i) and the alcohol solvent are mixed together with the ratio of pitch to alcohol solvent being 1:2-2:1, particularly 1:1 by volume and inputted into the ball mill. When the volume ratio of alcohol is higher than said range, the resulting short friction cycle with the balls leads to the lower grinding efficiency, and the larger alcohol solvent volume lengthens the subsequent drying process, disadvantageously. When the volume ratio of alcohol is lower than said range, the coarsely crushed coal tar pitch and balls cannot be smoothly moved in the ball mill, so that the grinding efficiency also decreases.

As for the crosslinking agent used together with the alcohol solvent in the step (ii), hydrogen peroxide, iodine, sulfur and the like may be used, preferably at the amount of 0.5-5 parts by weight based on 100 parts by weight of the coal tar pitch. When the amount of the crosslinking agent is less than 0.5 parts by weight, the carbonization yield measured by TGA (Ar, 5° C./min., 1000° C., hereinafter the same condition has been applied to TGA) can be increased only slightly thus being ineffective. When the amount of the crosslinking agent is more than 5 parts by weight, the viscosity becomes increased to 110 cP or more owing to the excessive crosslinking reaction between the crosslinking agent and the aromatics in pitch, hindering the effective permeation of pitch into the CC composite preform. The crosslinking agent is used to improve the carbonization yield of pitch, while excluding heat treatment of the impregnating coal tar pitch. By the use of the crosslinking agent, the crosslinking reaction between the aromatic radicals in the impregnating pitch is derived, leading to an increase in the carbonization yield after the carbonization process at 1,000° C. or more followed by the graphitization process at 2,000° C. or more. For effective grinding and dissolution, the step (ii) is carried out at 50-300 rpm for at least 24 hours, and preferably for 24-48 hours. When the period is less than 24 hours, radical conversion is not carried out enough, thereby being unable to achieve a desired improvement in physical properties, and when it is more than 48 hours, the improvement in the grinding efficiency is not distinctly achieved.

In the step (iii), the ground and dissolved mixture from the step (ii) is preferably dried in a dryer at a temperature of 50-200° C. for 24 hours or more so as to sufficiently remove the alcohol solvent. When the drying temperature is less than 50° C., the drying time becomes longer and thus ineffective. When the drying temperature is more than 200° C., a polycondensation reaction between the aromatics in the coal tar pitch occurs, which leads an increase in the molecular weight and further a rapid increase in a melt viscosity in the temperature range of 335-450° C., resulting in a decrease in the impregnation efficiency.

In the step (iv), the mixture from which the alcohol solvent has been removed from the step (iii) is cooled to the room temperature (15~25° C.). Then, since the mixture has been agglomerated again during the previous step (iii) for removing alcohol, it is ground to the average particle size of 1,000 μm or less, preferably. When the average particle size of the ground mixture is more than 1,000 μm, the melting efficiency thereof in an impregnation process in which heat is applied to 200-300° C. for melting the impregnation pitch becomes lowered, disadvantageously.

EFFECT OF THE INVENTION

According to the method of the present invention comprising the steps so far described, prevented are an increase in the molecular weight owing to polycondensation of aromatics in the pitch; the generation of mesophase pitch having a lamella structure; and the formation of an anisotropic structure, by eliminating the conventional heat treatment. Therefore, it is possible to provide an impregnating pitch having a low viscosity as well as improved carbonization yield, wherein the impregnating pitch stably maintains a low viscosity below 26 cP without an increase at the time of melting at 335-450° C., owing to said prevention of the molecular weight increase, and shows an improved carbonization yield of 42% or more measured by TGA owing to the crosslinking reaction between the aromatic radicals in pitch. And, by using such impregnating pitch, it is possible to provide the final CC composites having an isotropic structure, which exhibit excellent strength, stiffness and anti-abrasion properties.

EXAMPLES

Figure 1:
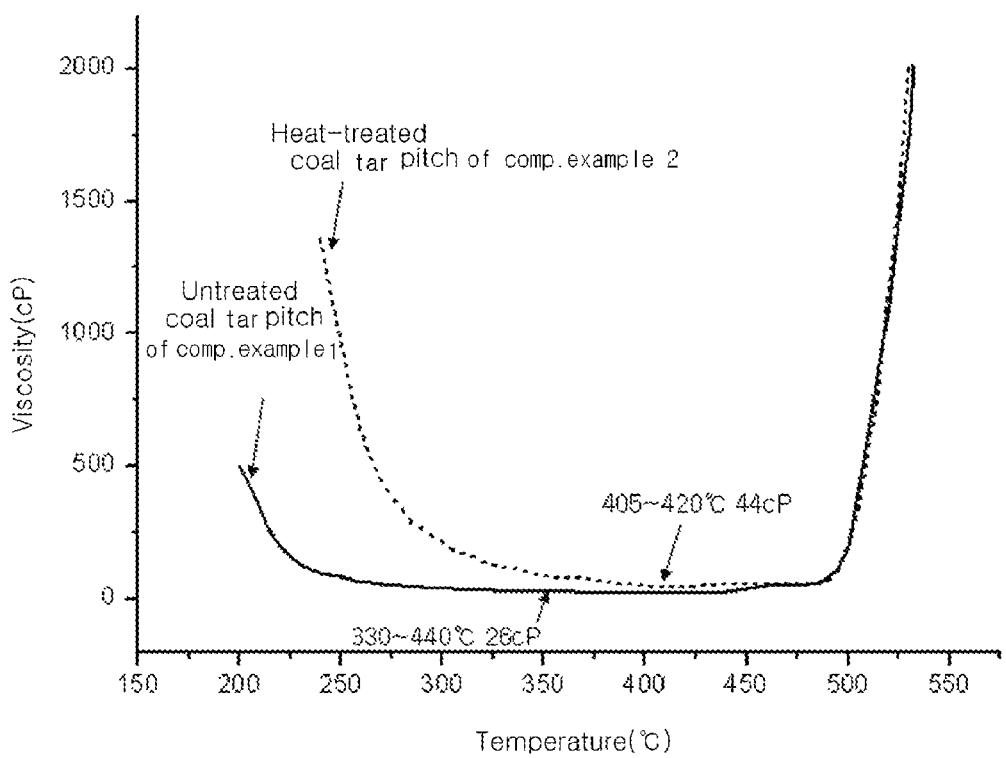
FIG. 1 is a graph showing changes in the viscosity of a heat-treated coal tar pitch according to the conventional method, and a raw coal tar pitch, as a function of a temperature.

Hereinafter, the present invention is further illustrated in detail through the following examples and comparative examples.

Comparative Examples 1 and 2

The preparation of an impregnating pitch for CC composite in these comparative examples can be carried out by using conventionally known methods, for example methods disclosed in Korean registered patent No. 0653929, Japanese laid-open patent applications 1998-145392 and 1994-248274, which were briefly described below:

30 kg of coal tar pitch of which softening point and carbonization yield is 114.8° C. and 36.9%, respectively was prepared (comparative example 1).

The coal tar pitch was inputted into a reactor and heated at 350° C. for 8 hours to obtain a heat-treated product (comparative example 2). During the heat treatment, the reactor was maintained under vacuum condition (100 torr) for sufficient discharge of volatile components. The atmospheric condition inside the reactor was not specifically limited, and stirring was not carried out.

The carbonization yield of the heat-treated product prepared by the comparative example 2 was determined by TGA. Viscosity was measured by the method of ASTM D5018, with increasing the temperature at the speed of 2° C./minute to 500° C. Quinoline and toluene insolubles were measured by the method for alcohol insolubles according to ASTM D2318. The results were represented in Table 1. β-resin content (%) was determined by subtracting quinoline insolubles from the toluene insolubles.

350° C. for 8 hours of the comparative example 2 shows 44 cP at 405-420° C. that is the low viscosity section, while the untreated coal tar pitch of the comparative example 1 shows 26 cP at 330-440° C. that is the low viscosity section. From this result, it can be found that the heat-treated pitch of the comparative example 2 is not stable in a temperature section exhibiting a low viscosity.

Example 1

Raw coal tar pitch having a softening point of 114.8° C. and the carbonization yield of 36.9% as used in the comparative examples was used to prepare the impregnating pitch of the present invention as described below.

30 kg of the raw coal tar pitch was crushed to the average particle size of 1,000 μm, and then mixed with ethanol at the ratio of 1:1 by volume. After adding 0.42 kg (1.4 parts by weight based on 100 parts by weight of the raw coal tar pitch) of iodine as a crosslinking agent to the resulted mixture of the crushed pitch and the alcohol solvent, it was inputted into a ball mill and ground at the speed of 300 rpm for 24 hours for sufficient grinding and dissolution. The ground and dissolved pitch mixture was placed in a dryer at the temperature of 200° C. and maintained therein for 24 hours so as to sufficiently remove the alcohol solvent and be dried. Then, the dried mixture was cooled to a room temperature and ground to the average particle size of 1,000 μm, obtaining an impregnating pitch for CC composite. The above procedures were carried out in the air, without forming an inert atmosphere, and care was taken lest heat of 200° C. or more be applied. Accordingly, the impregnating pitch for CC composite of the present invention was obtained by inducing crosslinking reactions between aromatic radicals in pitch through the use of a crosslinking agent and dissolution by using a ball mill, while excluding heat treatment of a coal tar pitch for CC composite.

For the prepared impregnating pitch, the carbonization yield was measured by TGA, and the viscosity was measured

TABLE 1

| | Reaction temperature (° C.) | Reaction time (hour) | Carbonization yield (%) | Viscosity (cP) | Quinoline insolubles (%) | Toluene insolubles (%) | β-resin (%) |
| --- | --- | --- | --- | --- | --- | --- | --- |
| Comp. Ex. 1 | 25 | 0 | 36.9 | 26 | 8.6 | 34.0 | 25.4 |
| Comp. Ex. 2 | 350 | 8 | 43.3 | 44 | 11.4 | 43.7 | 32.3 |

As seen from Table 1, the comparative example 2 using a coal tar pitch heat-treated at 350° C. for 8 hours showed increased carbonization yield by 6.4% and β-resin content by 6.9%, relative to those of comparative example 1 using raw coat pitch without heat treatment, thereby having a potential for improvement in CC composite density through carbonization process at 1,000° C. and graphitization process at 2,000° C. However, as it can also be seen from Table 1, the heat-treated pitch of the comparative example 2 showed an increased viscosity by 18 cP relative to that of the comparative example 1, so that the molten pitch of the comparative example 2 will not effectively penetrate into a CC composite preform.

Further referring to FIG. 1 that shows viscosity changes of pitch as a function of a temperature, the heat-treated pitch at by the method according to ASTM D5018 with increasing the temperature at 2° C./min to 500° C. The quinoline and toluene insolubles were determined, respectively by the method according to ASTM D2318. The results were represented in the following Table 2.

Example 2

An impregnating pitch for CC composite was prepared by the same method as described in the example 1, except that 0.6 kg (2.0 parts by weight) of a crosslinking agent, iodine was used. Physical properties of the obtained impregnating pitch were determined by the same method as described in the example 1 and the results were represented in Table 2.

TABLE 2

| | Amount of crosslinking agent (parts by weight) | Carbonization yield (%) | Viscosity (cP) | Quinoline insolubles (%) | Toluene insolubles (%) | β-resin (%) |
|---|---|---|---|---|---|---|
| Example 1 | 1.4 | 42.30 | 24 | 15.1 | 49.8 | 34.7 |
| Example 2 | 2.0 | 44.60 | 32 | 16.9 | 54.5 | 37.6 |

As seen from Table 2, the impregnating pitches prepared by the examples 1 and 2 using a crosslinking agent showed an improved carbonization yield of 42.30% and 44.60%, respectively, i.e. increased by at least 5.4% relative to the carbonization yield (36.9%) of the untreated pitch of the comparative example 1; and an improved β-resin content of 34.7% and 37.6%, i.e. increased by at least 9.3%, thereby having a potential for improvement in CC composite density. Further, the melt viscosity of each pitch of examples 1 and 2 was determined to be 24 cP and 32 cP, respectively, which are as low as the molten pitch can easily penetrate into a CC composite preform.

Figure 2:
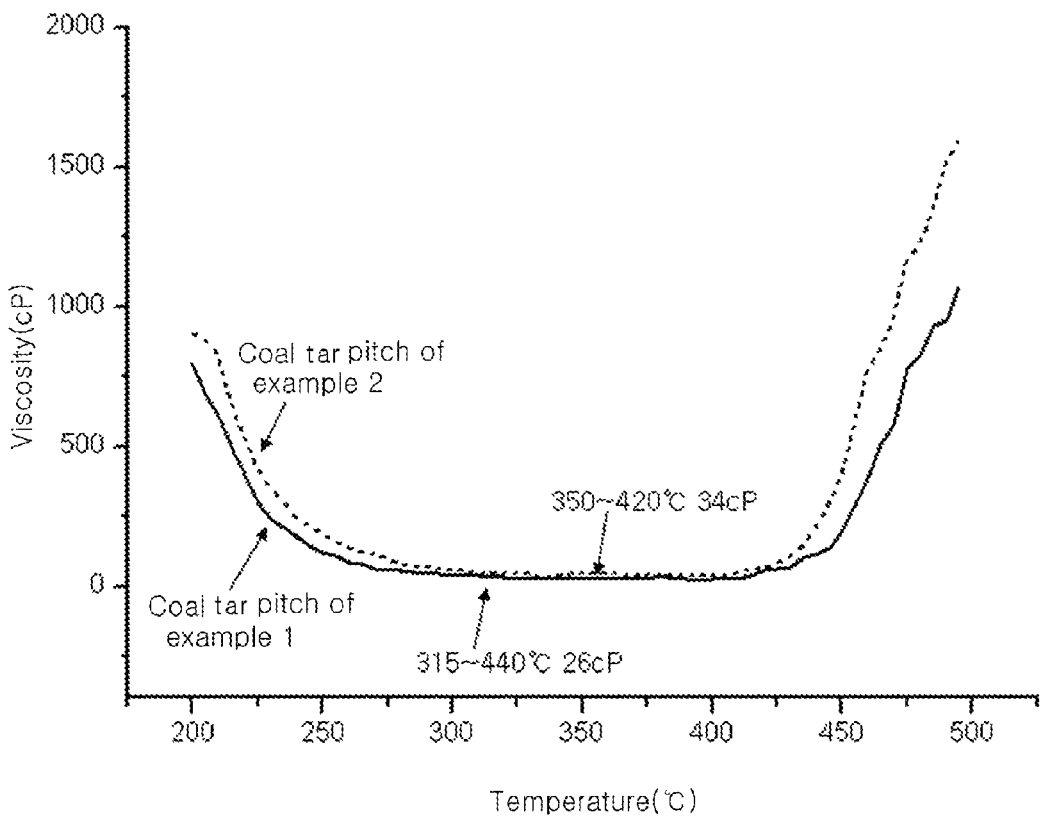
FIG. 2 is a graph showing changes in the viscosity of coal tar pitches according to the examples of the present invention, wherein a crosslinking reaction has been induced by the use of a crosslinking agent, as a function of a temperature.

Referring to changes in the viscosity as a function of a temperature represented in FIG. 2, the pitch of the example 2 using 2.0 parts by weight of a crosslinking agent showed the viscosity of 34 cP in the low viscosity section of 350-420° C., and the pitch of the example 1 using 1.4 parts by weight of a crosslinking agent showed the viscosity of 26 cP in the low viscosity section of 315-440° C., showing that a section exhibiting the low viscosity is broader and thus these examples are stable.

Figure 3:
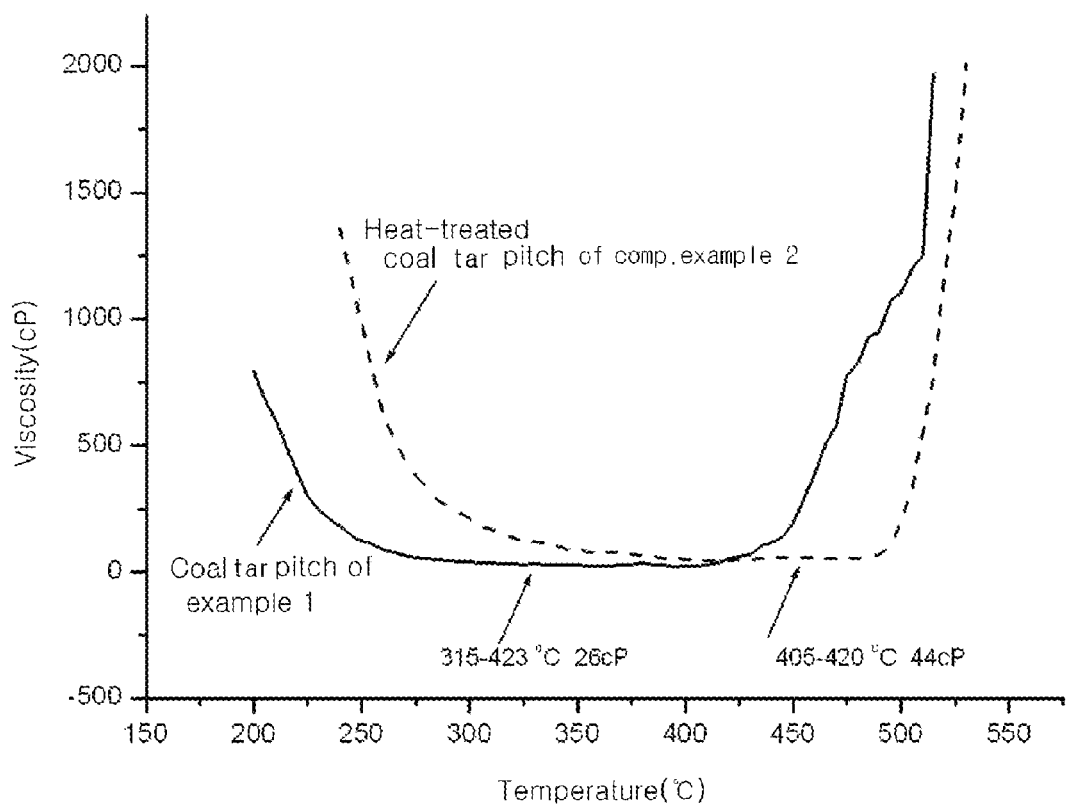
FIG. 3 is a graph showing changes in the viscosity of a coal tar pitch prepared without heat treatment according to the example 1 of the present invention, and a heat-treated pitch according to the conventional method, as a function of a temperature.
Figure 4:
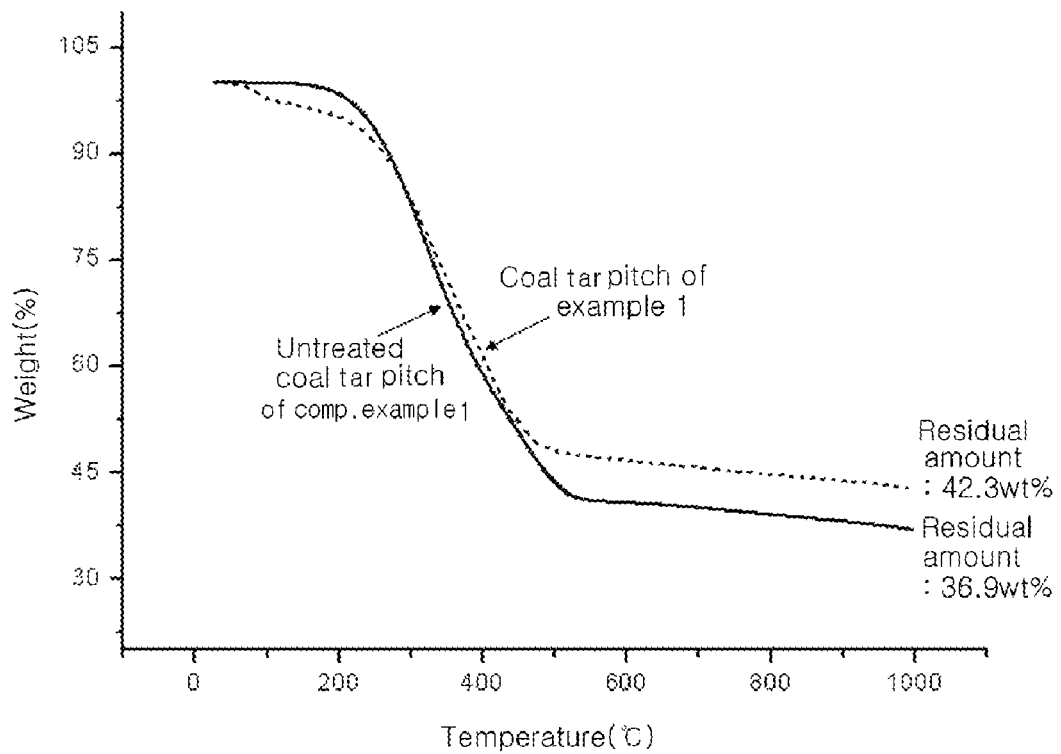
FIG. 4 is a graph showing changes in the TGA results of a coal tar pitch prepared without heat treatment according to the example 1 of the present invention, and a heat-treated pitch according to the conventional method.

As seen from FIG. 3 which shows changes in the viscosity of a coal tar pitch prepared without heat treatment by the example 1 wherein a crosslinking reaction was induced by using a crosslinking agent, and of a heat-treated pitch according to the comparative example 2, the pitch of the example 1 stably showed a low viscosity over the broader temperature range relative to the comparative example 2, without an increase in viscosity at the time of melting. Further, referring to FIG. 4 which shows changes in the carbonization yield measured by TGA of the example 1 and the comparative example 1, it is observed that the pitch of the example 1 showed increased carbonization yield of 42.3%, i.e. increased by 5.4% relative to that of the comparative example 1.

Consequently, it was confirmed that the pitch prepared by inducing a crosslinking reaction without heat treatment according to the example of the present invention was a very effective impregnating pitch for CC composite, since it showed an improved carbonization yield and at the same time no increase in viscosity.

What is claimed is:

1. A method for preparing an impregnating pitch for carbon-carbon composite comprising the following steps of:
    (i) crushing coal tar pitch;
    (ii) grinding the crushed coal tar pitch together with an alcohol solvent and a crosslinking agent;
    (iii) drying the mixture from the above step (ii) for removing the alcohol solvent; and
    (iv) cooling and grinding the mixture obtained from the above step (iii).

2. The method according to claim 1, wherein the crushing step (i) is conducted such that the average particle size of the coal tar pitch is 1000 μm or less.

3. The method according to claim 1, wherein the crushed coal tar pitch and the alcohol solvent in the step (ii) are used at the mixing ratio of 1:1 by volume.

4. The method according to claim 1, wherein the crosslinking agent used in the step (ii) is selected from the group consisting of hydrogen peroxide, iodine and sulfur.

5. The method according to claim 1, wherein the crosslinking agent used in the step (ii) is used at the amount of 0.5-5 parts by weight, per 100 parts by weight of the crushed coal tar pitch.

6. The method according to claim 1, wherein the grinding step (ii) is conducted by using a ball mill.

7. The method according to claim 1, wherein the drying step (iii) is conducted at the temperature of 50-200° C.

8. The method according to claim 1, wherein, in the step (iv), the mixture from the step (iii) is cooled to the room temperature and then ground to the average particle size of 1,000 μm or less.

* * * * *